United States Patent [19]

Sasaki

[11] Patent Number: 5,547,568

[45] Date of Patent: Aug. 20, 1996

[54] FUEL FILTER

[75] Inventor: Noriyoshi Sasaki, Yokohama, Japan

[73] Assignee: NIFCO Inc., Japan

[21] Appl. No.: 317,938

[22] Filed: Oct. 4, 1994

[30] Foreign Application Priority Data

Oct. 4, 1993 [JP] Japan ................. 5-053719 U
Jan. 24, 1994 [JP] Japan ................. 6-005857

[51] Int. Cl.⁶ .................... B01D 35/02; B01D 29/15
[52] U.S. Cl. ............... 210/172; 210/232; 210/416.4; 210/460; 210/483
[58] Field of Search ................ 210/172, 232, 210/416.4, 452, 460, 483

[56] References Cited

U.S. PATENT DOCUMENTS

| | | | |
|---|---|---|---|
| 3,023,905 | 3/1962 | McDougal et al. | 210/172 |
| 4,617,121 | 10/1986 | Yokoyama. | |
| 4,618,422 | 10/1986 | Sasaki et al.. | |
| 4,743,370 | 5/1988 | Mizusawa. | |
| 4,874,510 | 10/1989 | Akira et al. | 210/172 |
| 4,966,522 | 10/1990 | Koyama | 210/172 |
| 5,049,271 | 9/1991 | Cain | 210/416.4 |
| 5,055,187 | 10/1991 | Ito et al. | 210/172 |
| 5,120,434 | 6/1992 | Yoshida | 210/172 |

FOREIGN PATENT DOCUMENTS

| | | | |
|---|---|---|---|
| 4026230 | 10/1991 | Germany | 210/172 |
| 4102474 | 8/1992 | Germany | 210/416.4 |
| 4-17181 | 2/1992 | Japan. | |

*Primary Examiner*—Peter A. Hruskoci
*Assistant Examiner*—Theodore M. Green
*Attorney, Agent, or Firm*—Parkhurst, Wendel & Burr

[57] ABSTRACT

A flexible frame formed by a longitudinal frame and transverse frames is inserted into a bag-shaped mesh. A bent portion, whose bent surface contacts an inner surface of the mesh, extends either upwardly or downwardly from a distal end of each transverse frame so that the mesh is made hollow. Accordingly, suction force of a suction on pipe does not cause upper and lower surfaces of the mesh to tightly contact each other, thereby resulting in reliable suction of fuel contained within a fuel tank. Further, since the bent surfaces of the bent portions contact the inner surface of the mesh, the mesh is not abraded due to vibrations of the vehicle or the like.

27 Claims, 9 Drawing Sheets

PRIOR ART

FUEL FILTER

BACKGROUND OF THE INVENTION

1. Field of the Invention

The present invention relates to a fuel filter through which dirt, water and the like contained in fuel is filtered.

2. Description of the Related Art

In a fuel filter disposed within a fuel tank, a holding frame is inserted into a bag-shaped mesh so that the surfaces of the mesh do not fit closely together during suction. In this way, the fuel can be reliably filtered at the hollow mesh and sucked.

Figure 9:
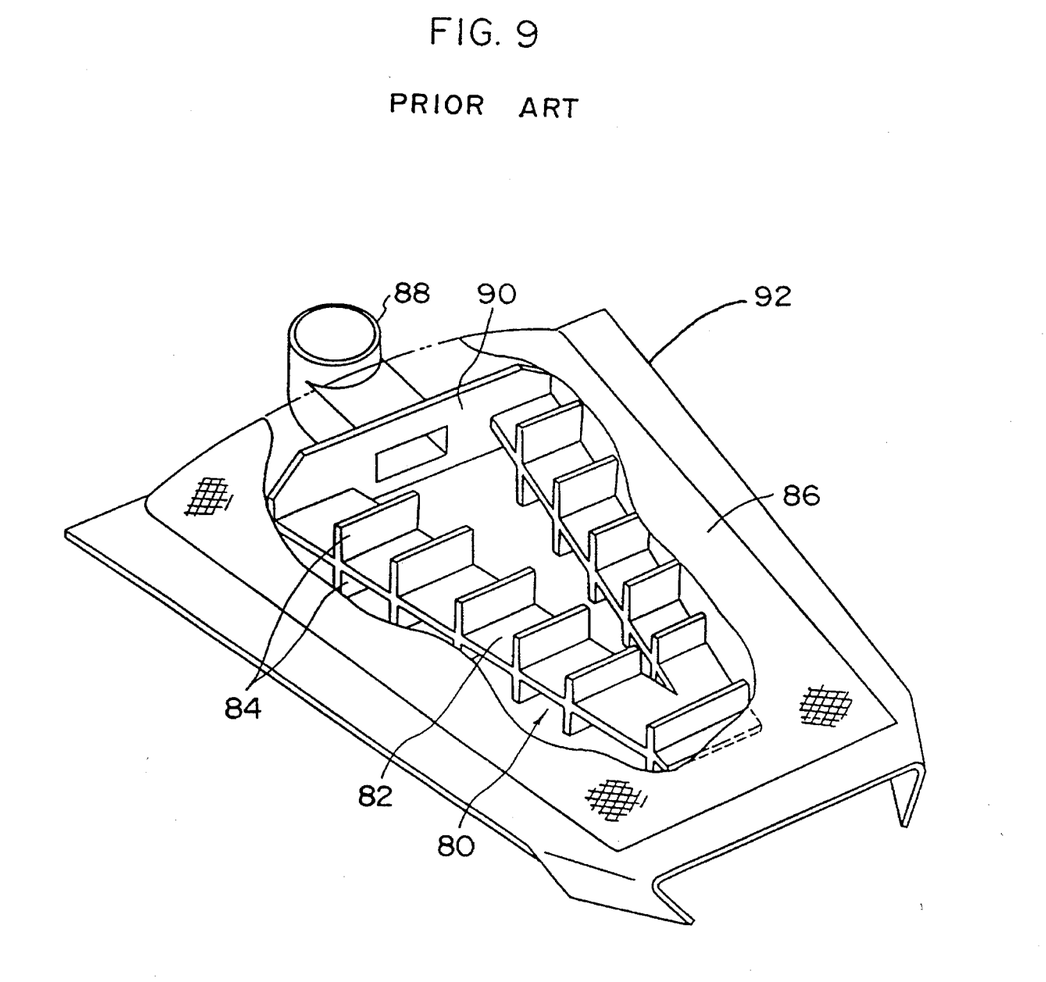
FIG. 9 is a partially-cut perspective view of a conventional fuel filter.

However, as illustrated In FIG. 9, in a conventional holding frame 80 (Japanese Utility Model Application Laid-Open No. 4-17181), a bag-shaped mesh 86 is pushed and expanded from the inner side thereof by holding members 84 which project at the top and bottom surfaces of a longitudinal frame 82. Due to vibrations of a vehicle or the like, the corner portions of the holding members 84 may abrade the mesh 86, resulting in the tearing thereof. As a result, a mesh which has been subjected to special processing is used for the mesh 86, and an inexpensive, non-woven fabric cannot be used.

Further, because the fuel within the fuel tank is absorbed to the maximum limit, it is preferable that the leading ends of the mesh 86 contact the bottom surface of the fuel tank. However, dispersion in upward and downward directions may occur due to errors in manufacturing the fuel tank, errors in assembling a filter 92, or the like.

The conventional holding frame 80 is formed integrally with a flange 90 provided with a mounting pipe 88. Therefore, the holding frame 80 follows the movement of the flange 90, and the ends of the mesh 86 may separate from the bottom surface of the fuel tank. Further, volumes of fuel tanks vary in accordance with the type of vehicle. When, conversely, the filter 92 is pushed forcibly against the bottom surface of the fuel tank, the mesh 86 may bend so that fuel cannot be absorbed.

SUMMARY OF THE INVENTION

In view of the aforementioned, an object of the present invention is, to provide a fuel filter in which wearing of the filter due to abrasion against a holding frame can be prevented. Another object of the present invention is to provide a fuel filter in which a holding frame does not follow the movement of a flange. Still another object of the present invention is to provide a fuel filter which does not bend sharply or collapse.

In the fuel filter of a first aspect of the present invention, a mesh bag main body is mounted to a fuel suction pipe within a fuel tank, and the fuel filter comprises: a frame disposed within the bag main body, one end of the frame being connected to the fuel suction pipe; and bag expanding members provided at the frame and expanding the bag main body, respective portions the bag expanding members which portions contact the bag main body being bent surfaces, and the bag expanding members reducing friction resistance between the bag expanding members and the bag main body.

In the fuel filter of the first aspect, the fuel within the fuel tank is filtered at the bag main body, and is sucked at the suction pipe.

A frame is inserted in the bag main body. Bag expanding members project at the frame in order to make the bag main body hollow. The bent surfaces formed at the bag expanding members provided at the frame contact the inner surface of the bag main body.

Due to the functions of the frame and the bag expanding members, the upper and lower surfaces of the bag main body do not tightly contact each other due to the suction force of the suction pipe, and the fuel within the fuel tank can be reliably sucked. Further, because the bent surfaces of the bag expanding members contact the inner surface of the bag main body, the bag main body is not abraded due to vibrations of the vehicle or the like.

In accordance with the fuel filter of another aspect of the invention, the holding member is disposed at at least one of the flange and the final end portion of the flange. Because the bent surface of the holding member contacts the inner surface of the longitudinal direction end portion of the bag main body, the bag main body is not abraded due to vibrations of the vehicle or the like. Further, the longitudinal direction end portion of the bag main body can also be made hollow.

In the fuel filter of still another aspect of the present invention, because there is no worry that the bag main body will be abraded by the bag expanding portions, the bag main body can be made of a two-layered structure of a non-woven fabric, thereby resulting in a decrease in the cost of the filter material. A non-woven fabric is a fabric in which natural or synthetic fibers are arranged unsystematically or are tangled together by an adhesive, by the application of heat and pressure, or by sewing.

In the fuel filter of yet another aspect of the present invention, the flexible connecting member connects the flange and the frame, and slits are formed at the connecting regions of the flange and the connecting member. These slits are set so as to permit movement of the flange independently of the frame. Therefore, even if the flange moves, the frame does not move so as to follow the movement of the flange. As a result, even if the mounting position of the flange varies slightly due to errors in the manufacturing of the fuel tank or the like, the frame does not move. Therefore, a portion of the bag main body can be positioned at the bottom surface of the fuel tank.

In the fuel filter of still another aspect, protrusions, which protrude in both directions and which make the bag main body hollow, are provided in vicinities of the connecting member and the connecting portion between the connecting member and the frame. As a result, even if the frame is pushed against the bottom surface of the fuel tank and the connecting member is greatly bent, the protrusions maintain the hollow state of the bag main body. Therefore, the bag main body does no bend sharply or collapse.

DESCRIPTION OF THE PREFERRED EMBODIMENTS

Figure 1:
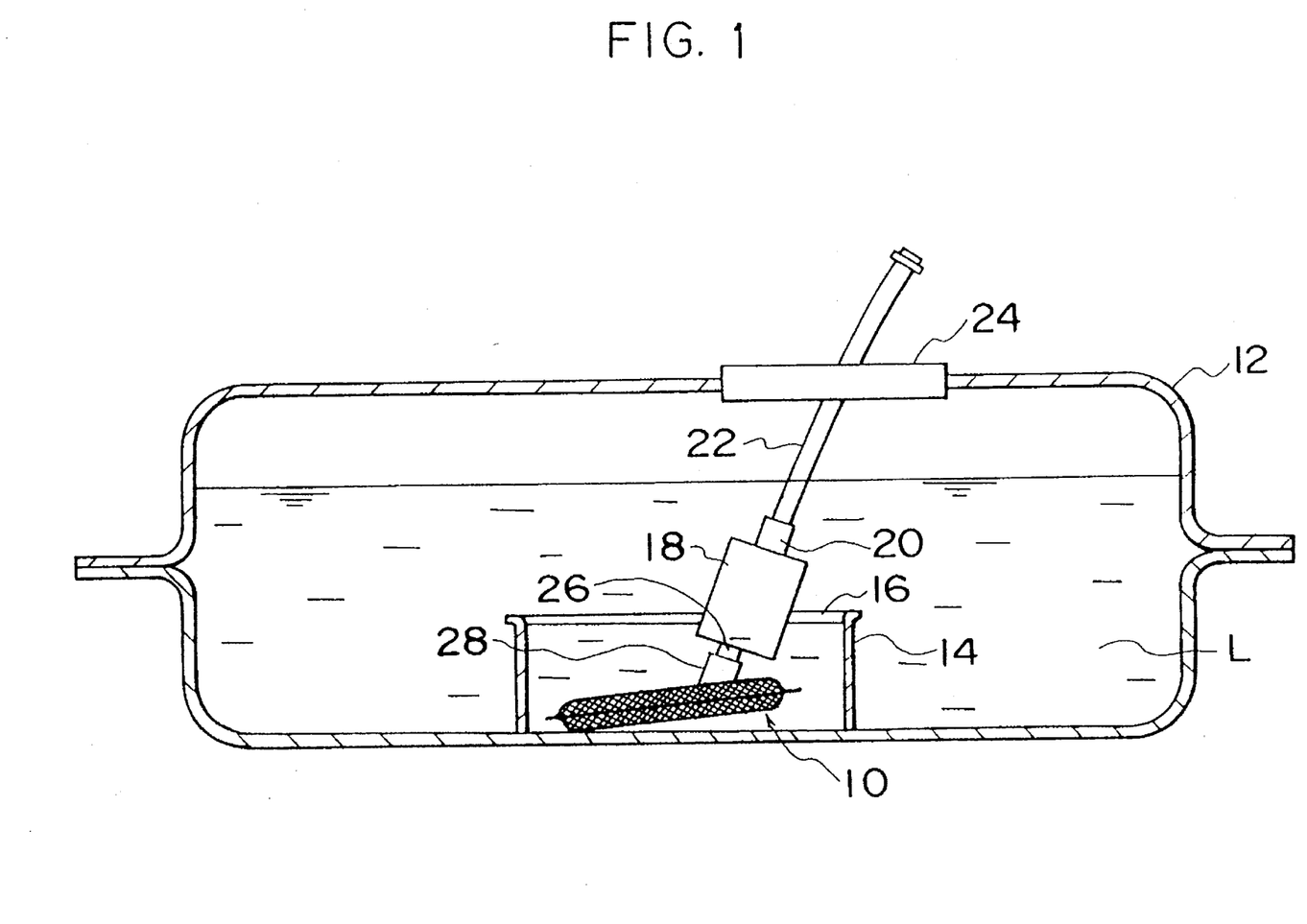
FIG. 1 is a sectional view illustrating a state in which a fuel filter relating to the first embodiment is mounted to a fuel tank.

As illustrated in FIG. 1, a fuel filter 10 relating to a first embodiment is disposed within a chamber 14 located in a fuel tank 12.

A fuel pump 18 is fixed in an inclined state to a supporting plate 16 provided at the upper portion of the chamber 14. A supply pipe 22 is connected to a discharge opening 20 of the fuel pump 18 so as to supply fuel to an unillustrated engine. Further, the upper portion of the supply pipe 22 is fixed to a flange 24 which is formed at the upper surface of the fuel tank 12.

A suction pipe 28 of the fuel filter 10 is connected to a suction opening 26 of the fuel pump 18. In this way, when the fuel pump 18 is driven, after fuel L within the fuel tank 12 is filtered at the fuel filter 10, the fuel L is sent to the engine via the suction pipe 28.

Figure 2:
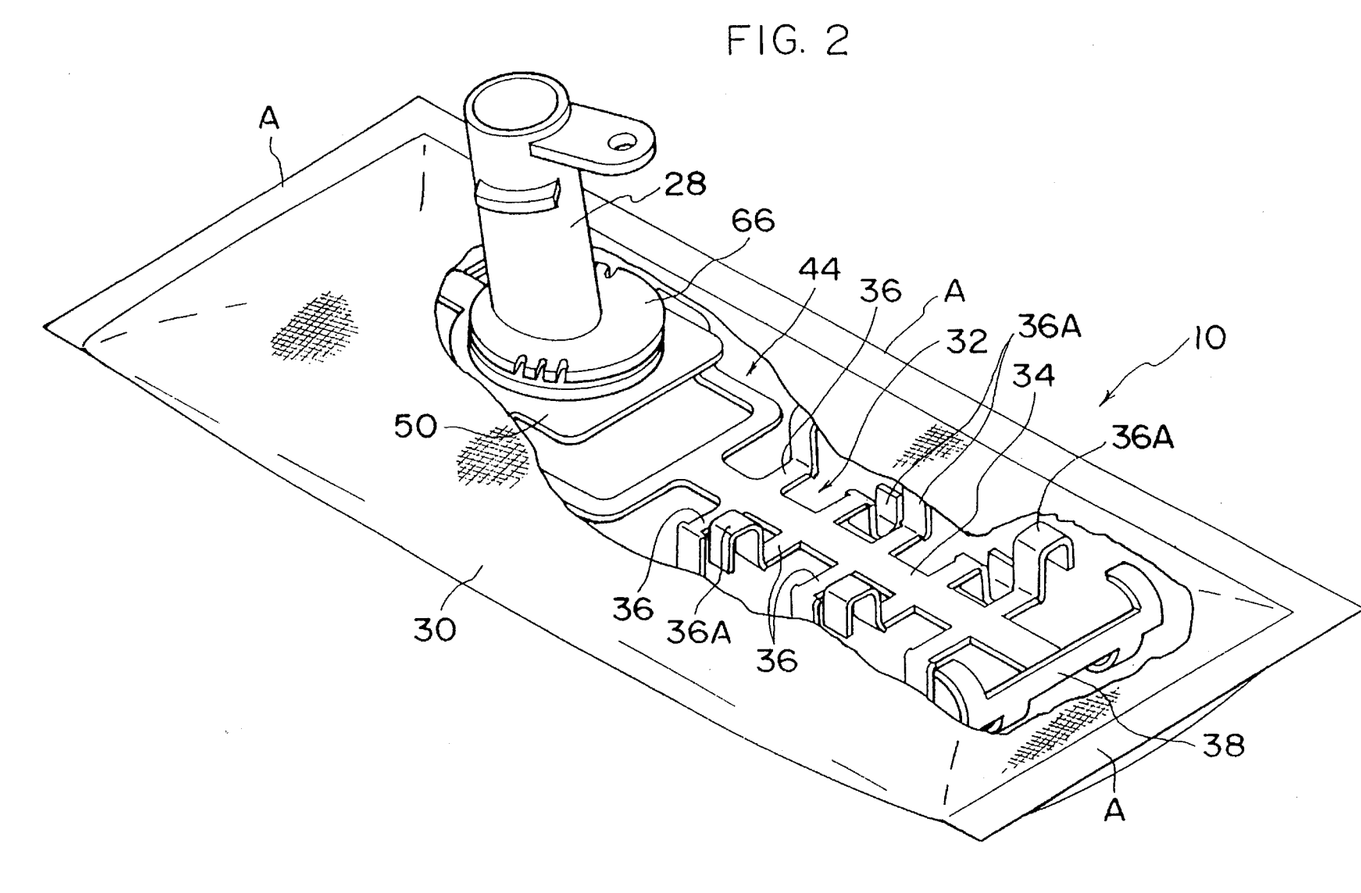
FIG. 2 is a partially-cut perspective view of the fuel filter relating to the first embodiment.
Figure 3:
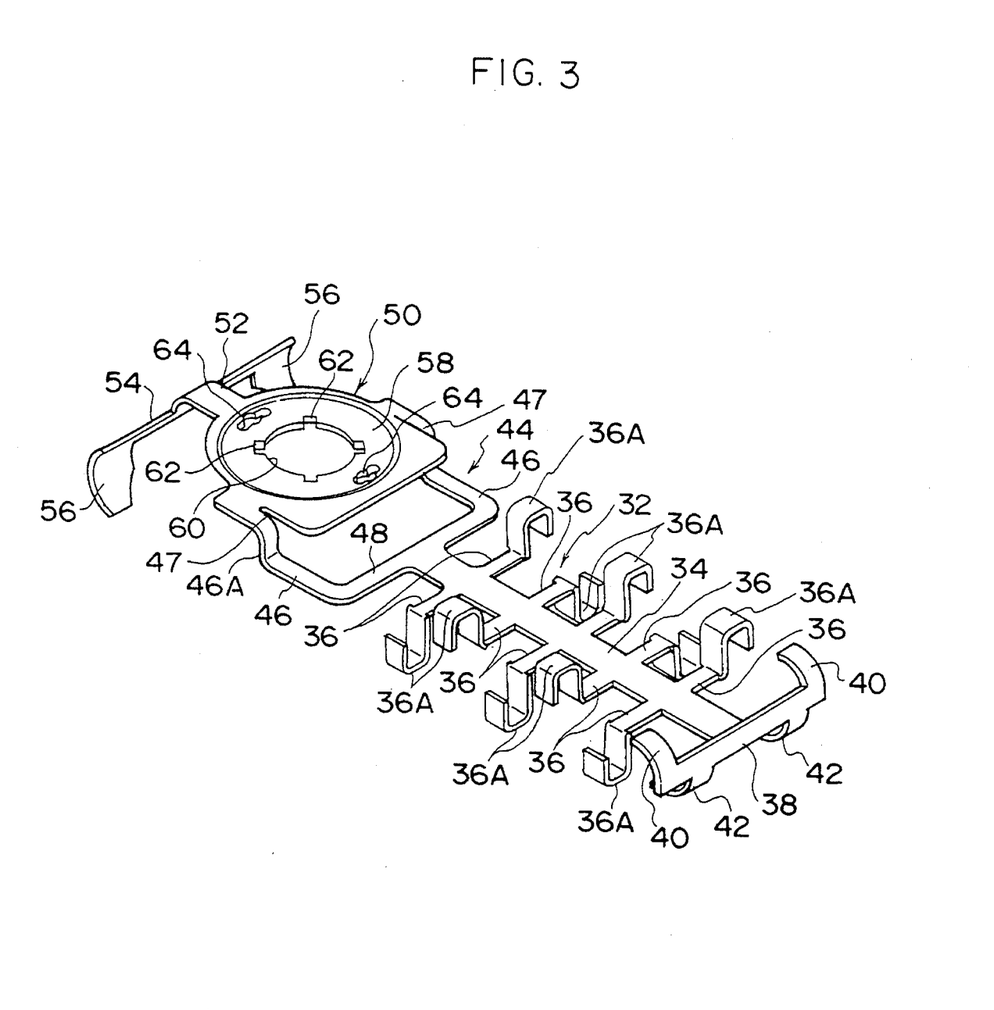
FIG. 3 is a perspective view of a frame forming the fuel filter relating to the first embodiment.

As illustrated in FIGS. 2 and 3, the fuel filter 10 is formed by a bag-shaped mesh 30, which serves as a bag main body, and a frame 32 which is inserted in the interior portion of the mesh 30.

The frame 32 is formed by a longitudinal frame 34 and transverse frames 36. The longitudinal frame 34 is flexible, shaped as a thin plate, and extends in the longitudinal direction of the mesh 30. The transverse frames 36 are flexible, are disposed at predetermined intervals from the longitudinal frame 34, and jut out toward both transverse direction edges of the mesh 30.

A bent portion 38A is formed at the distal end portion of the transverse frame 36. The bent portion 36A is bent so as to project in the direction of thickness of the mesh 30, and the bent surface thereof contacts the inner surface of the mesh 30. The bent portions 36A alternately project upwardly and downwardly along the lengthwise direction of the longitudinal frame 34. Further, at opposing positions across the longitudinal frame 34 as well, the bent portions 36A alternately project upward and downward. The bent portions may respectively be a cylindrical surface, a spherical surface or any other edge surface which is not sharp. The mesh 30 is made hollow by the bent portions 36A pushing and expanding the mesh 30 from the inner side thereof. Further, because the bent portions 36A are disposed so that the open sides thereof are alternately up and down, two portions of a forming mold can be divided at the longitudinal frame 34.

At one end of the longitudinal frame 34, a transverse rib 38 extends in the transverse direction of the mesh 30 so as to be positioned at a longitudinal direction end portion of the mesh 30. A quarter-circle arc shaped holding member 40 projects upwardly at each end of the transverse rib 38. Further, a pair of quarter-circle arc shaped holding members 42 projects downwardly at the intermediate portion of the transverse rib 38.

A connecting frame 44, which is substantially U-shaped when viewed from above, is connected to the other end of the longitudinal frame 34. The connecting frame 44 is formed of a transverse member 48 and longitudinal members 46. The transverse member 48 projects parallel to the transverse frames 36 and is connected to the longitudinal frame 34. The longitudinal members 46 extend parallel to each other from the ends of the transverse member 48. A stepped portion 46A is formed in the middle of each longitudinal member 46. The height of the distal end of the longitudinal member 46 is approximately the same height as the bent portions 36A formed at the ends of the transverse frames 36. When the size of the fuel tank 12 in which the fuel filter 10 is disposed changes, the stepped portions 46A elastically deform the frame 32 in accordance with the contact pressure between the mesh 30 and the fuel tank 12. In this way, the fuel filter 10 of the present invention can be made to correspond to variations, of a certain degree, in the mounting structure. Accordingly, opening of the holes of the mesh 30 and wear of the mesh 30, which are caused by friction between the mesh 30 and the fuel tank 12, can be prevented. Further, the distal end of the longitudinal member 46 is connected to a circular flange 50. More specifically, the end of each longitudinal member 46 is connected to a region at which a radius of the flange 50, which radius is parallel to the transverse frames 36, intersects the circumference of the flange 50. In other words, slits 47 which are parallel to the longitudinal members 46 as seen from above are formed in the vertical members 46 and a circumferential portion of the flange 50. By providing the slits 47, the frame 32 does not move along with the movement of the flange 50.

A tongue member 52, whose distal end is bent, projects from the flange 50 at the side opposite to the frame 32. The intermediate portion of a transverse rib 54 is connected to the distal end of the tongue member 52. Wide holding plates 56, which are bent toward the bottom surface of the mesh 30, are formed at the ends of the transverse rib 54.

Further, a circular depressed surface 58 is formed at the central portion of the flange 50. A circular hole 60 is formed at the center of the depressed surface 58. Positioning notches 62 are formed in a cross-shaped configuration so as to extend the inner circumferential portion of the circular hole 60 outwardly in the radial direction. Further, a pair of elliptic engagement holes 64 are formed so as to oppose each other in the remaining portion of the depressed surface 58 not cut out by the circular hole 60.

Figure 4:
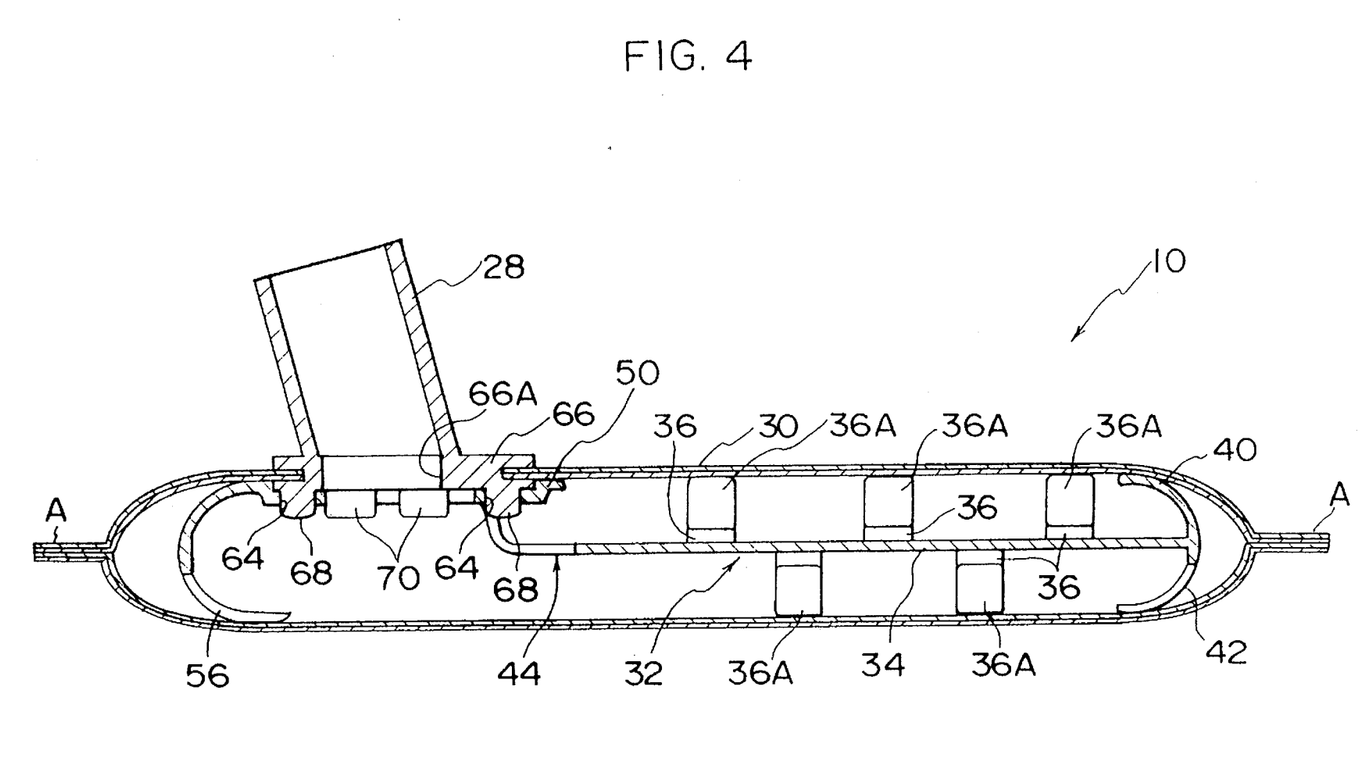
FIG. 4 is a sectional view of the fuel filter relating to the first embodiment.

As illustrated in FIG. 4, a mounting flange 66 is welded to the inner side of the upper surface of the mesh 30. The inclined suction pipe 28 stands from the mounting flange 66 toward the outer side of the mesh 30. Protrusions 68 which protrude downwardly are formed at the outer peripheral portion of the bottom surface of the mounting flange 66. In a state in which a through-hole 66A of the mounting flange 66 and the axial center of the circular hole 60 coincide, the protrusions 68 engage with the engagement holes 64. Pawls 70 are formed at the mounting flange 66 and engage with the positioning notches 62 which are disposed in the cross-shaped configuration, so as to determine the direction of inclination of the suction pipe 28.

Further, the mesh 30 is a two-layer structure of a non-woven fabric. Meshes which filter the fuel are formed in the non-woven fabric. The mesh 30 is folded in two such that two layers thereof are superposed, and enfolds the frame 32 and the flange 50. The three sides A, with the exception of the folded portion, are heat welded.

Next, operation of the fuel filter 10 relating to the present embodiment will be explained.

When the fuel pump 18 is driven, dirt and the like mixed in the fuel is filtered by the mesh 30, and the clean fuel is sent to the engine via the suction pipe 28.

At this time, the top and bottom surfaces of the bag-like mesh 30 attempt to fit closely together due to the suction force. However, the hollow state is maintained by the bent portions 36A provided within the mesh 30, and the fuel L within the fuel tank 12 can be reliably sucked.

Moreover, the holding members 40, 42 and the holding plates 56 disposed at both longitudinal direction ends of the mesh 30 make both end portions hollow as well. Therefore, only a small load need be applied to the fuel pump 18.

For each of the bent portions 36A, the holding members 40, 42, and the holding plate 56, the bent portions of these members contact the inner surface of the mesh 30. Therefore, the mesh 30 is not abraded due to vibrations of the vehicle or the like. As a result, a non-woven fabric can be used as the mesh material, and costs can be reduced.

Figure 5:
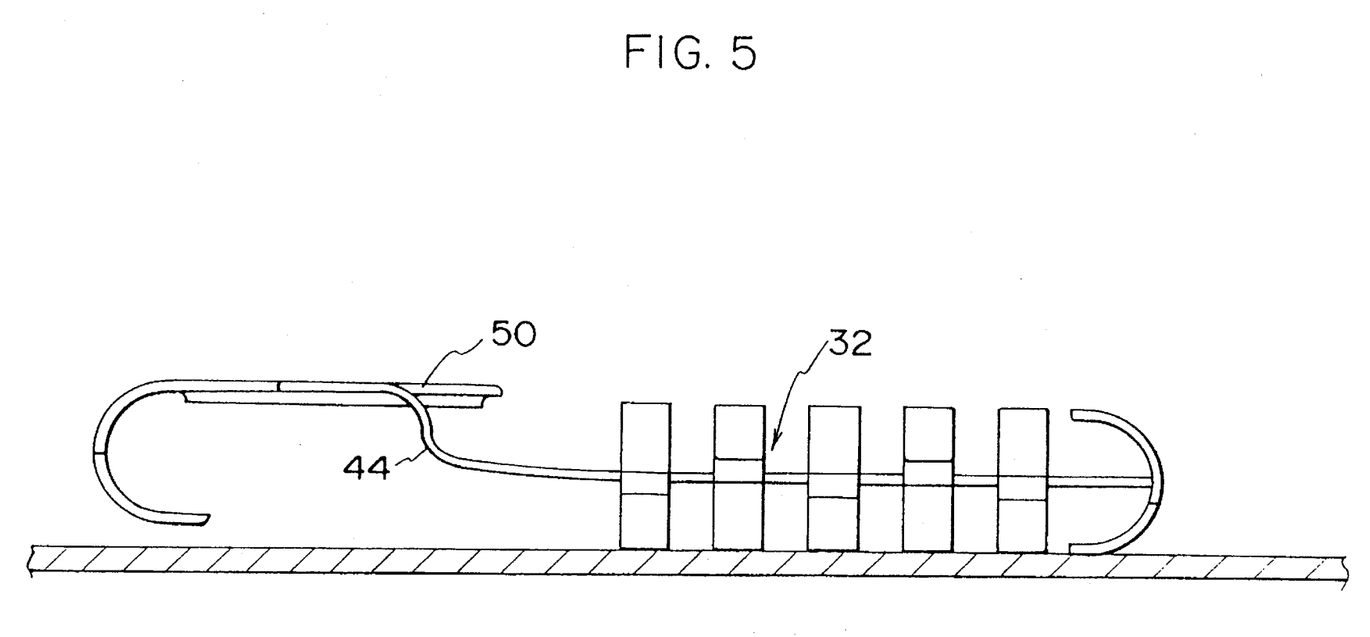
FIG. 5 is a side view illustrating a variant state of the frame forming the fuel filter relating to the first embodiment.
Figure 6:
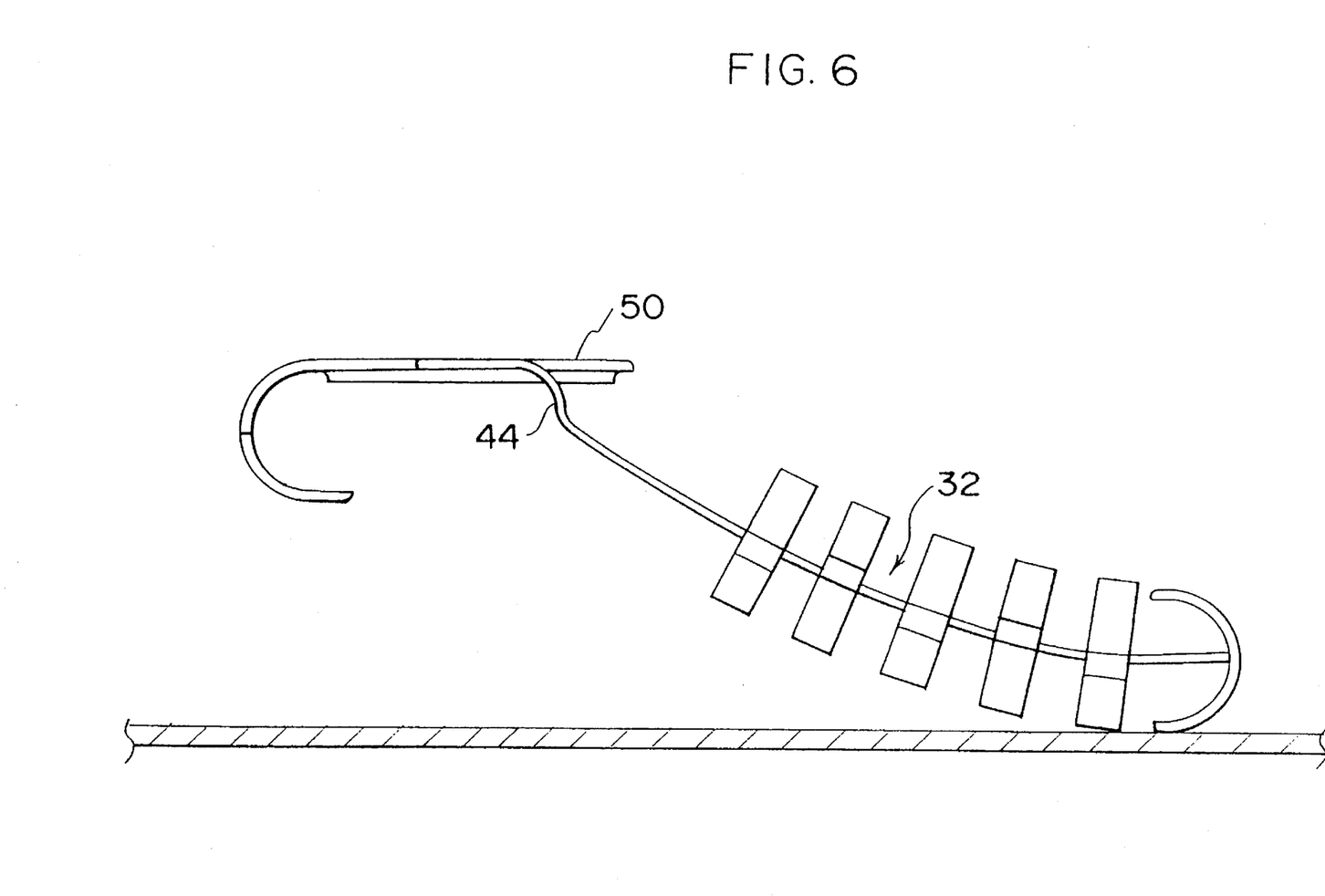
FIG. 6 is a side view illustrating a variant state of the frame forming the fuel filter relating to the first embodiment.

As illustrated in FIGS. 5 and 6, there are cases in which there may be dispersion in upward and downward directions in the mounting position of a flange 50 due to errors in the manufacturing of the fuel tank or the like. However, at the connecting frame 44, the slits 47 (see FIG. 3) are provided at the connecting portions so that the frame 32 moves differently than the flange 50. Therefore, the end of the mesh 30 can always be positioned at the bottom surface of the fuel tank 12. As a result, the fuel L of the fuel tank 12 can be completely sucked.

In order for the end portion of the frame 32 (the end of the mesh 30) to contact the bottom surface of the fuel tank even if the position at which the flange 50 is mounted to the vehicle changes from the state illustrated in FIG. 5 to the state illustrated in FIG. 6, the connecting frame 44 may be made flexible so as to bend due to the weight of the frame 32 and the mesh 30. Alternatively, the end portion of the frame 32 may be manufactured so as to be located in advance at a position which is lower than the flange 50 (as in the state illustrated in FIG. 6).

Further, the relative movement between the frame 32 and the flange 50 as illustrated in FIGS. 5 and 6 may be accomplished, even if the slits 47 are not provided, by having the frame 32 and the connecting frame 44 deform elastically.

Next, a fuel filter 100 relating to a second embodiment will be described.

Figure 7:
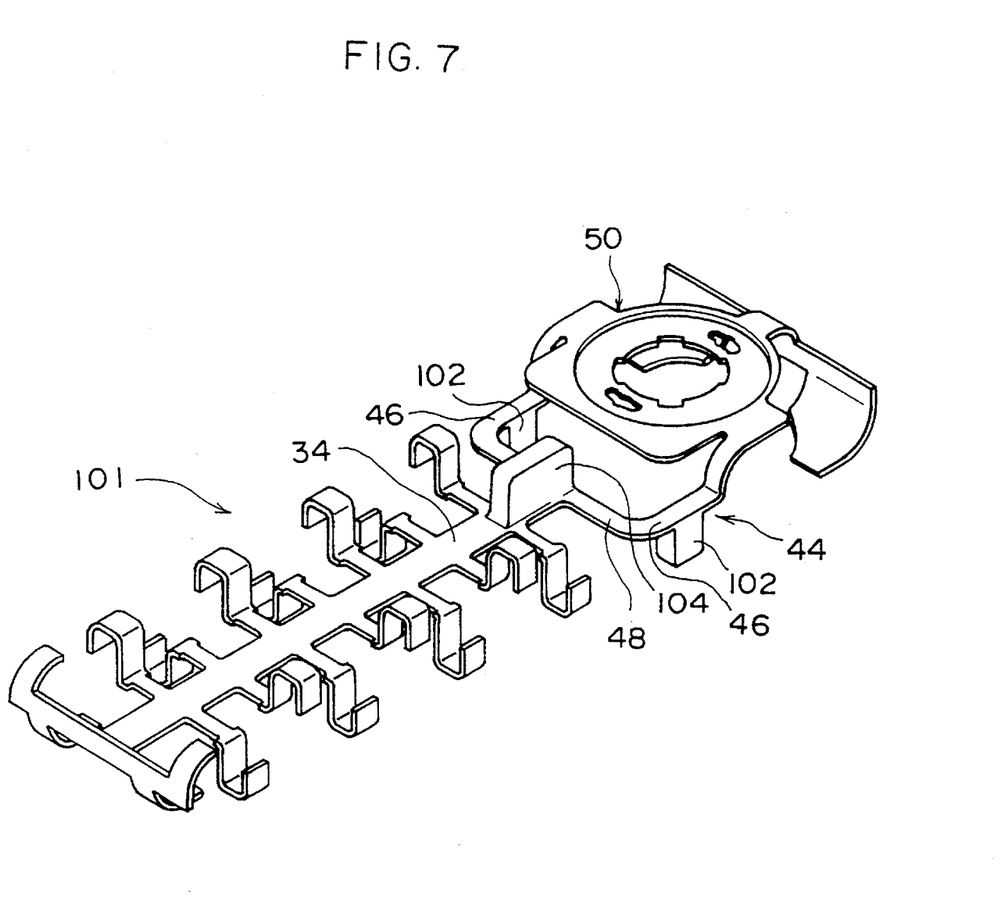
FIG. 7 is perspective view of a frame forming a fuel filter relating to a second embodiment.
Figure 8:
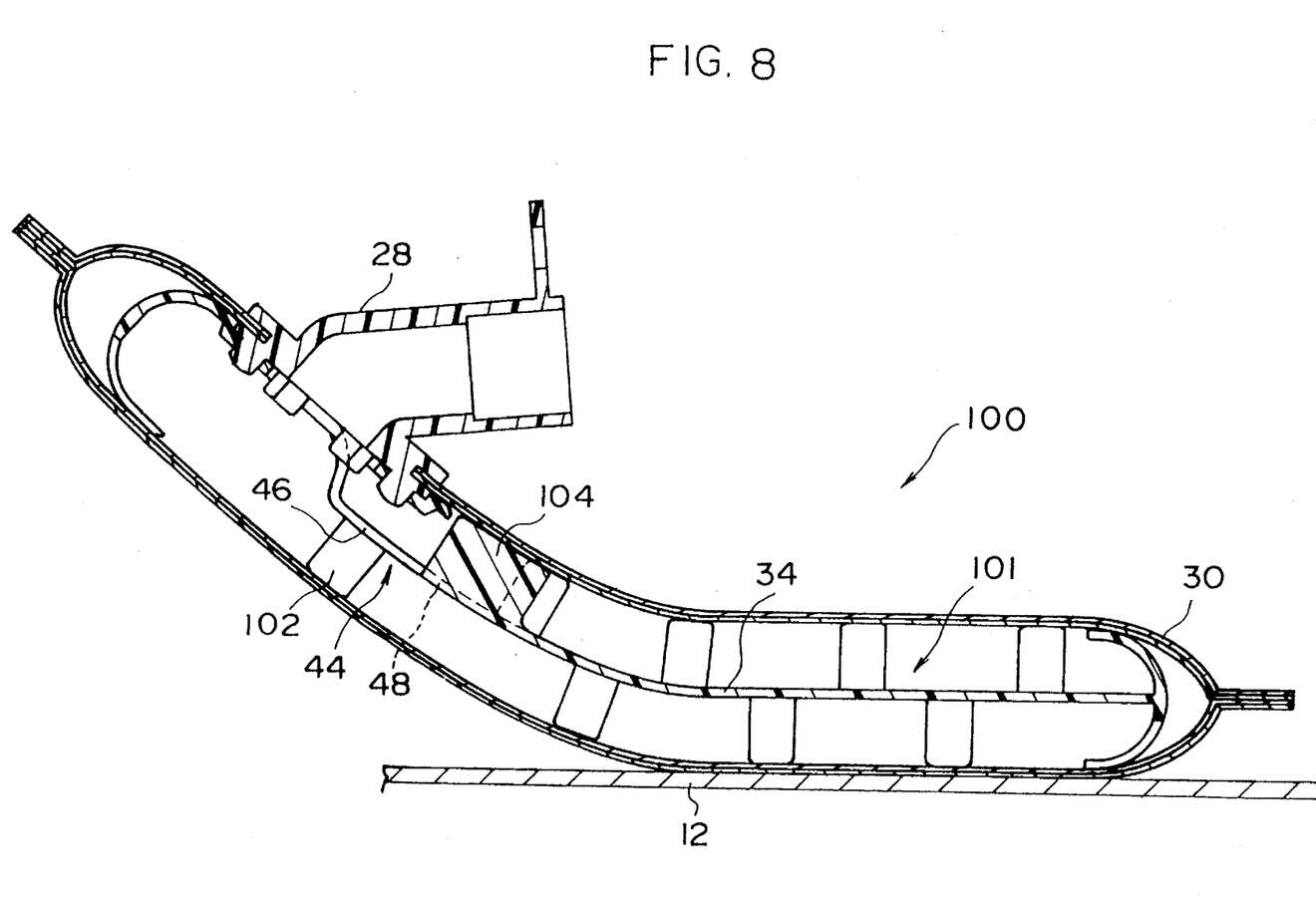
FIG. 8 is a sectional view illustrating a variant state of the fuel filter relating to the second embodiment.

In the second embodiment, as illustrated In FIG. 7, projecting members 102 project from the bottom surfaces of the longitudinal members 46 of the connecting frame 44 which is joined to a frame 101. A projecting member 104 projects from the top surface of the vicinity of the connecting portion of the longitudinal frame 34 and the horizontal member 48. The distal ends of the projecting members 102, 104 are rounded so that the mesh 30 is not damaged. Further, in a state of ordinary use, the projecting members 102, 104 do not contact the mesh 30. As illustrated in FIG. 8, even if there is a great difference in the sizes, configurations, or attachment positions of the fuel tanks 12 due to differences in types of vehicles or the like, and the connecting frame 44 bends greatly, the projecting members 102, 104 maintain the hollow state of the mesh 30, and prevent the mesh 30 from bending sharply and collapsing.

Due to the above-described structure of the present invention, wearing of the mesh due to friction with the frame can be prevented. Further, because the frame does not follow the movement of the flange, the fuel in the fuel tank can be completely sucked. Moreover, even if the frame is strongly pushed against the fuel tank, the filter does not bend sharply or collapse.

What is claimed is:

1. A fuel filter for connection to a fuel suction pipe within a fuel tank, comprising:
   a bag main body having first and second opposite ends and an inner surface; and
   an expanding frame disposed in the bag main body, the frame comprising a generally elongate extension extending parallel to a longitudinal axis and having first and second ends, and a plurality of bag expanding members extending generally parallel to a first transverse axis, the first transverse axis being transverse to the longitudinal axis, said expanding members having opposing bent portions protruding generally parallel to a second transverse axis which is transverse to the longitudinal axis and to the first transverse axis, the bent portions alternately protruding along mutually opposing directions which are generally parallel to the second transverse axis, the bent portions contacting the inner surface of the bag main body to prevent collapse of the bag main body.

2. The fuel filter of claim 1, wherein the elongate extension of the frame includes first and second lateral sides, the expanding members extending from both the first and second lateral sides.

3. The fuel filter of claim 2, wherein the expanding members form a plurality of pairs each including first and second expanding members which are adjacent to each other along a direction generally parallel to the first transverse axis, wherein the bent portions of the first and second expanding members respectively protrude along the mutually opposing directions.

4. The fuel filter of claim 2, wherein the bent portions of expanding members which are adjacent to each other along a direction parallel to the longitudinal axis protrude along the mutually opposing directions.

5. The fuel filter of claim 1, wherein the bent portions are generally U-shaped.

6. The fuel filter of claim 1, wherein said frame is elastically deformable.

7. The fuel filter of claim 1, further comprising a flange interconnecting the frame with the bag main body, the flange being adapted to receive a fuel suction pipe.

8. The fuel filter of claim 7, wherein said frame is connected to the flange via a connecting portion extending from the first end of the frame, the connecting portion having at least one slit therein for permitting bending of the frame with respect to the flange.

9. The fuel filter of claim 8, wherein said connecting portion comprises a flexible connecting member.

10. The fuel filter of claim 9, further comprising a protruding member extending along a direction generally parallel to the second transverse axis from the connecting member, whereby the bag main body is maintained in an expanded state upon bending the frame with respect to the flange.

11. The fuel filter of claim 7, further comprising a holding member extending from said flange, said holding member having bent extensions for expanding the bag main body at the first end thereof.

12. The fuel filter of claim 11, wherein said holding member contacts opposing inner surface portions of the bag main body.

13. The fuel filter of claim 7, further comprising a protruding member extending along a direction generally parallel to the second transverse axis, whereby the bag main body is maintained in an expanded state upon bending of the frame with respect to the flange.

14. The fuel filter of claim 1, further comprising a holding member extending from the second end of the frame, the holding member being bent and contacting the inner surface of bag body at the second end thereof.

15. The fuel filter of claim 14, wherein said holding member comprises a plurality of opposing arms.

16. The fuel filter of claim 15, wherein said arms extend parallel to the second transverse axis and are bent along the longitudinal axis.

17. The fuel filter of claim 1, wherein the bag main body comprises at least two layers of a non-woven material.

18. The fuel filter of claim 1, further comprising a protruding member extending along a direction generally parallel to the second transverse axis, whereby the bag main body is maintained in an expanded state upon bending of the frame.

19. A fuel filter for connection to a fuel suction pipe within a fuel tank, comprising:

a bag main body having first and second opposite ends and an inner surface;

an expanding frame disposed in the bag main body, the frame comprising a generally elongate extension extending parallel to a longitudinal axis and having first and second ends, and a plurality of bag expanding members extending generally parallel to a first transverse axis, the first transverse axis being transverse to the longitudinal axis, said expanding members having opposing bent portions protruding generally parallel to a second transverse axis which is transverse to the longitudinal axis and to the first transverse axis, the bent portions alternately protruding along mutually opposing directions which are generally parallel to the second transverse axis, the bent portions contacting the inner surface of the bag main body to prevent collapse of the bag main body; and a flange interconnecting the frame with the bag main body, the flange being adapted to receive a fuel suction pipe.

20. The fuel filter of claim 19, wherein said frame is elastically deformable.

21. The fuel filter of claim 20, wherein said connecting portion comprises a flexible connecting member.

22. The fuel filter of claim 21, further comprising a holding member extending from the second end of the frame, the holding member comprising a plurality of opposing arms which are bent and contact the inner surface of the bag main body at the second end thereof.

23. The fuel filter of claim 19, further comprising a holding member extending from said flange, said holding member having bent extensions for expanding the bag main body at the first end thereof.

24. The fuel filter of claim 19, wherein the elongate extension of the frame includes first and second lateral sides, the expanding members extending from both the first and second lateral sides.

25. The fuel filter of claim 24, wherein the expanding members form a plurality of pairs each including first and second expanding members which are adjacent to each along a direction generally parallel to the first transverse axis, wherein the bent portions of the first and second expanding members respectively protrude along the mutually opposing directions.

26. The fuel filter of claim 24, wherein the bent portions of expanding members which are adjacent to each other along a direction parallel to the longitudinal axis protrude along the mutually opposing directions.

27. The fuel filter of claim 19, wherein the bent portions are generally U-shaped.

* * * * *